(12) United States Patent
Schieszer (10) Patent No.: US 8,596,214 B2
(45) Date of Patent: Dec. 3, 2013

(54) WOOD GRILLING PLANK SOAKING DEVICE

(76) Inventor: Larry J. Schieszer, Mission, KS (US)

( * ) Notice: Subject to any disclaimer, the term of this patent is extended or adjusted under 35 U.S.C. 154(b) by 394 days.

(21) Appl. No.: 12/893,871

(22) Filed: Sep. 29, 2010

(65) Prior Publication Data

US 2011/0076412 A1 Mar. 31, 2011

Related U.S. Application Data (60) Provisional application No. 61/246,867, filed on Sep. 29, 2009.

(51) Int. Cl.
| | |
|---|---|
| *B05C 3/00* | (2006.01) |
| *B05C 19/02* | (2006.01) |
| *B05C 13/00* | (2006.01) |
| *B05C 13/02* | (2006.01) |
| *B05C 21/00* | (2006.01) |
| *B05D 1/18* | (2006.01) |

(52) U.S. Cl.
USPC ........ 118/428; 427/430.1; 118/429; 118/500; 118/DIG. 9; 118/503

(58) Field of Classification Search
USPC ............... 118/407, 428, 429; 427/430.1, 440; 220/23.88, 44, 88; 219/433; 426/533
See application file for complete search history.

(56) References Cited

U.S. PATENT DOCUMENTS

| | | | | |
|---|---|---|---|---|
| 265,403 | A * | 10/1882 | Gaylord et al. | 210/245 |
| 1,085,742 | A * | 2/1914 | Leffel | 454/67 |
| 1,892,079 | A * | 12/1932 | Rose | 118/428 |
| 2,465,747 | A * | 3/1949 | Pessel | 204/278 |
| 2,724,392 | A * | 11/1955 | Cooper | 134/46 |
| 3,055,536 | A * | 9/1962 | Dieny | 220/203.11 |
| 3,895,137 | A * | 7/1975 | Avramidis et al. | 427/295 |
| 4,126,521 | A * | 11/1978 | Coffin | 205/119 |
| 4,361,247 | A * | 11/1982 | Williams | 220/88.1 |
| 4,507,330 | A * | 3/1985 | Schaaf | 427/98.5 |
| 6,000,574 | A * | 12/1999 | Portillo | 220/736 |
| 7,485,831 | B2 * | 2/2009 | Tynes et al. | 219/433 |
| 7,938,285 | B2 * | 5/2011 | Raichlen et al. | 220/23.88 |
| 2002/0027080 | A1 * | 3/2002 | Yoshioka et al. | 205/123 |
| 2004/0216622 | A1 * | 11/2004 | Martin | 99/482 |
| 2005/0263401 | A1 * | 12/2005 | Olsen et al. | 205/143 |
| 2005/0271783 | A1 * | 12/2005 | Digges, III | 426/523 |
| 2007/0207270 | A1 * | 9/2007 | Ku | 427/430.1 |
| 2007/0255458 | A1 * | 11/2007 | Haslem | 700/282 |
| 2008/0223294 | A1 * | 9/2008 | Gebele et al. | 118/429 |
| 2010/0068404 | A1 * | 3/2010 | Wang et al. | 427/430.1 |
| 2010/0083899 | A1 * | 4/2010 | Hung et al. | 118/713 |
| 2011/0318493 | A1 * | 12/2011 | Wu et al. | 427/314 |
| 2012/0312229 | A1 * | 12/2012 | Pei | 118/56 |

* cited by examiner

*Primary Examiner* — Dah-Wei Yuan
*Assistant Examiner* — Karl V. Kurple
(74) *Attorney, Agent, or Firm* — Law Office of Mark Brown, LLC; Mark E. Brown; Christopher M. DeBacker (57) ABSTRACT

An apparatus and method for thoroughly soaking wood for use in the grilling or preparation of food. The apparatus being capable of accepting and soaking wood in the form of wood planks, wood chunks, or wood chips. The apparatus in a form of a tank which holds the cooking wood plank in liquid for any amount of time, ensuring that the plank absorbs the liquid evenly and for a long enough period for proper cooking. Other items can be added to the liquid while soaking, such as seasonings, sauces, or other wood types. These flavors will meld with the liquid in the tank and evenly distribute the flavor to the cooking plank.

10 Claims, 10 Drawing Sheets

WOOD GRILLING PLANK SOAKING DEVICE

CROSS REFERENCE TO RELATED APPLICATION

This application claims priority in U.S. Provisional Patent Application No. 61/246,867, filed Sep. 29, 2009, which is incorporated herein by reference.

BACKGROUND OF THE INVENTION

When grilling or otherwise cooking with a plank of wood beneath the food to be cooked, it is first necessary to properly infuse the plank with water. The present invention optimizes the process required to properly soak a plank of wood to be used for cooking.

Cooking food on hot wood planks is a well known method of preparing food that is becoming more popular. "Wood plank cooking" traditionally arises from the Pacific Northwest Native art of plank-grilling, an ancient tradition of cooking sides of fresh fish—specifically salmon—on alderwood or cedar. Plank-grilling fish and other foods on sections of soaked aromatic woods set over a grill is a very complex culinary experience. As the food cooks, essentially basting itself in its own oils and juices, it absorbs fragrant wood smoke to achieve a layering of flavors not found in any other form of cooking.

In order to properly use a wood plank to prepare and cook food, the plank must be thoroughly soaked in water or other liquid, such as juice, cider, or wine, for anywhere from twenty minutes to six hours. For shorter time periods, typically the plank will be run under water in a sink or placed in a pan or other container of water, resulting in under-soaking which can create fire hazards. For longer soaking periods, typically the plank is placed into a pan or bucket and some weight is placed on the wood to keep it submerged. This may result in uneven soaking as one end of the board lifts up while not being overseen, or even an entire side of the board if the weight holding the board down shifts entirely. Additionally, the area of the plank underneath of the weight may not absorb liquid or flavors effectively. Proper soaking requires even soaking for the entire time period to produce the optimal amount of smoke for food cooking and flavor without the risk of a fire.

Heretofore there has not been available a device implementing the system and method with the advantages and features of the present invention.

SUMMARY OF THE INVENTION

The present invention is a plank soaking tank for use in the soaking of wood planks for grilling or otherwise cooking food. The tank holds the cooking plank in liquid for any amount of time, ensuring that the plank absorbs the liquid evenly and for a long enough period for proper cooking. Other items can be added to the liquid while soaking, such as seasonings, sauces, or other wood types. These flavors will meld with the liquid in the tank and evenly distribute the flavor to the cooking plank.

BRIEF DESCRIPTION OF THE DRAWINGS

The drawings constitute a part of this specification and include exemplary embodiments of the present invention and illustrate various objects and features thereof.

DETAILED DESCRIPTION OF THE PREFERRED EMBODIMENT

I. Introduction and Environment

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Said terminology will include the words specifically mentioned, derivatives thereof and words of similar meaning.

Wood plank grilling can be performed using any type of wood, although it is usually performed using an aromatic type of wood, such as cedar, or wood from a fruit tree, such as apple-wood. Any type of wood of an appropriate size for plank grilling can be used in conjunction with the present invention. Additionally; liquids other than water are often used to soak a grilling plank in order to infuse additional flavors into the wood and thus into the food being cooked. All liquids are compatible with the present invention.

II. Embodiment or Aspect of the Plank Soaking System 2

The grilling plank soaking system 2 is generally comprised of a wood plank 4, a lid portion 6 and a tank portion 8. Said wood plank is placed between said lid and tank portions, and is then soaked in a liquid 42. In the preferred embodiment of the invention, the lid 6 and tank 8 portions are made of a transparent material, such as Plexiglas.

Figure 1A:
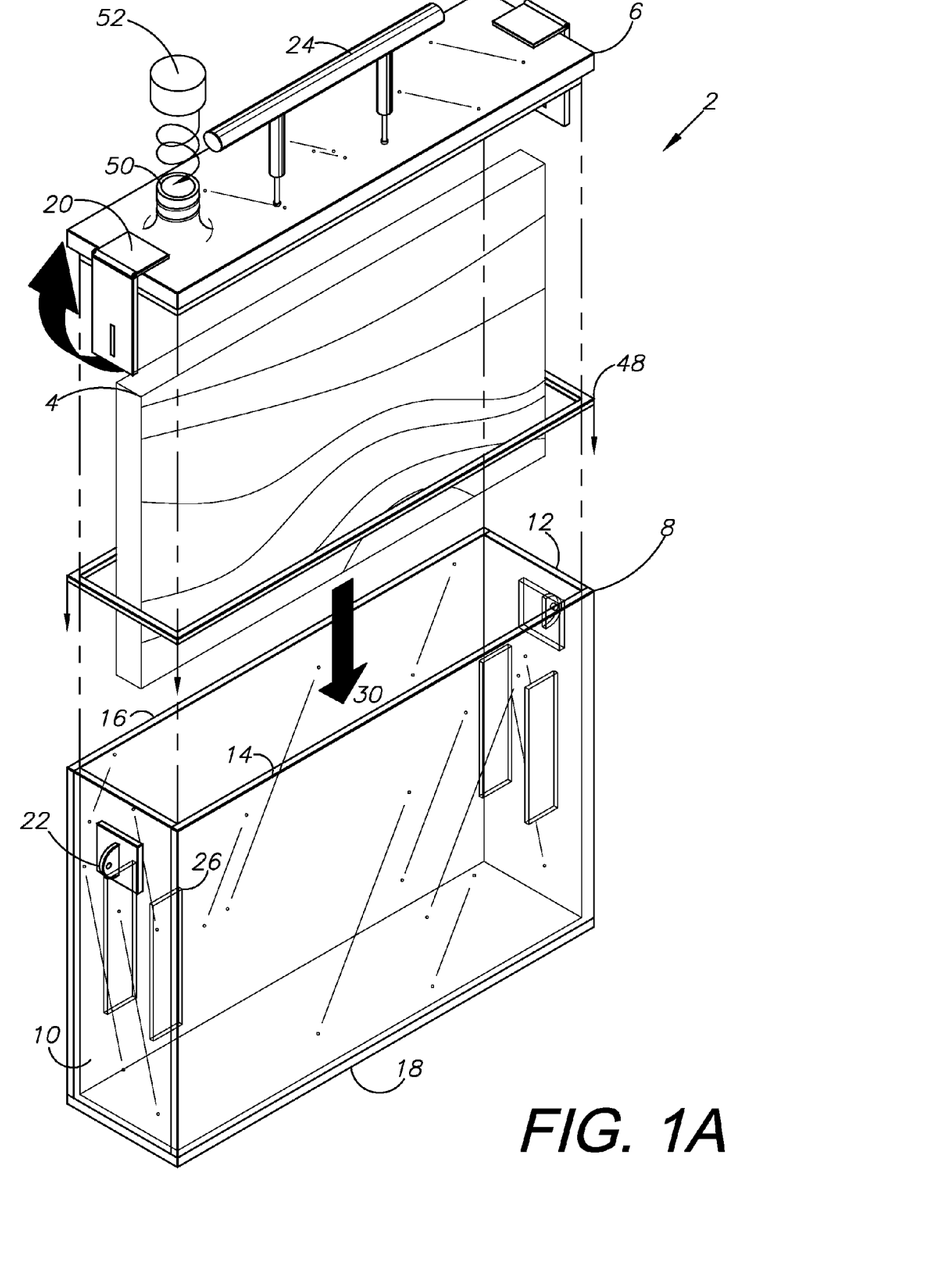
FIG. 1A is an isometric exploded view of the present invention.
Figure 1B:
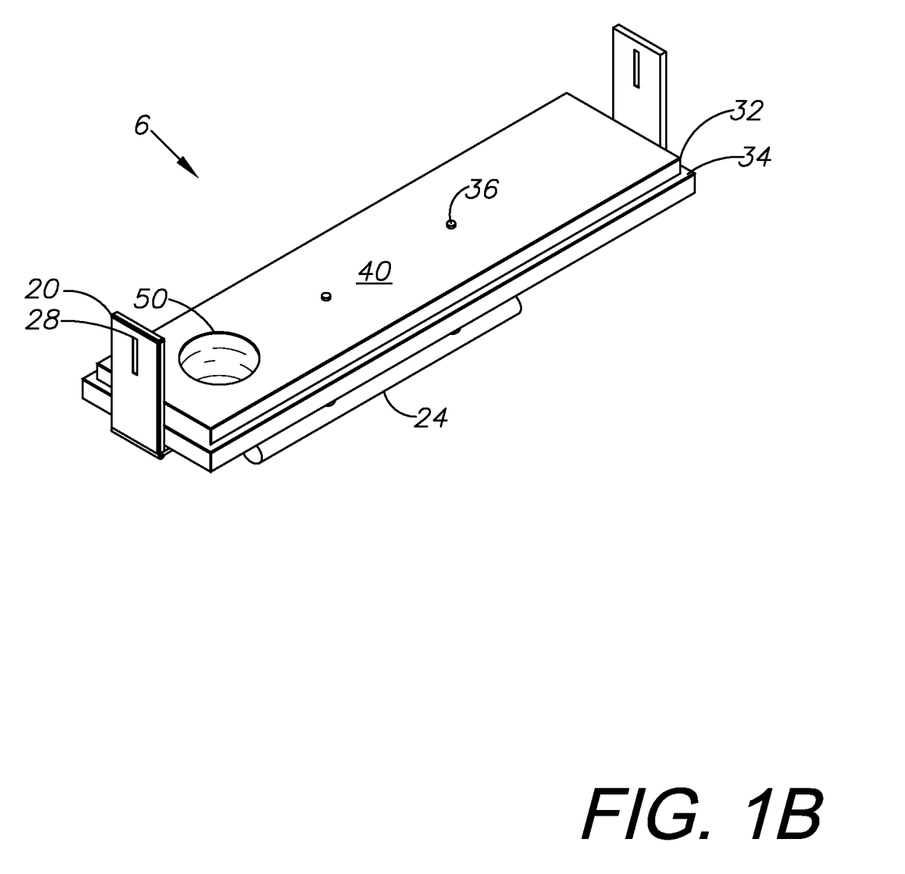
FIG. 1B is an isometric view of the lid portion of the present invention.

FIG. 1A shows the relationship between said lid portion 6 and said tank portion 8. FIG. 1B shows said lid portion from a different view. Said lid portion 6 is further comprised of a top face 38 and bottom face 40, and handle 24, a lip 34 and an inset lid seal 32. In the preferred embodiment, said handle 24 is attached to said lid portion 6 by at least two handle screws 36. Said tank portion 8 is further comprised of a left wall 10, a right wall 12, a front wall 14, a back wall 16, and a tank floor 18. Said tank walls enclose a space 30 which houses the liquid 42 and wood plank 4 for the soaking period. Situated between said lid portion 6 and tank portion 8 is a neoprene gasket 48. This gasket 48 creates a water-tight seal when the lid portion 6 and tank portion 8 come into contact and are securely attached as described in detail below.

Also shown in FIG. 1 in an exploded view is the relationship between the filling spout 50 and the filling spout cap 52. In an exemplary embodiment of the present invention, the filling spout cap 52 would be secured onto the filling spout 50 via a screw-like attachment, whereby the grooves on the inside of the cap would align with the grooves on the outside of the spout and interlock to form a water-tight seal. The purpose of the spout 50 is to allow the tank interior space 30 to be filled with water once the lid portion 6 is securely attached to the tank portion 8 as described in detail below.

Figure 2:
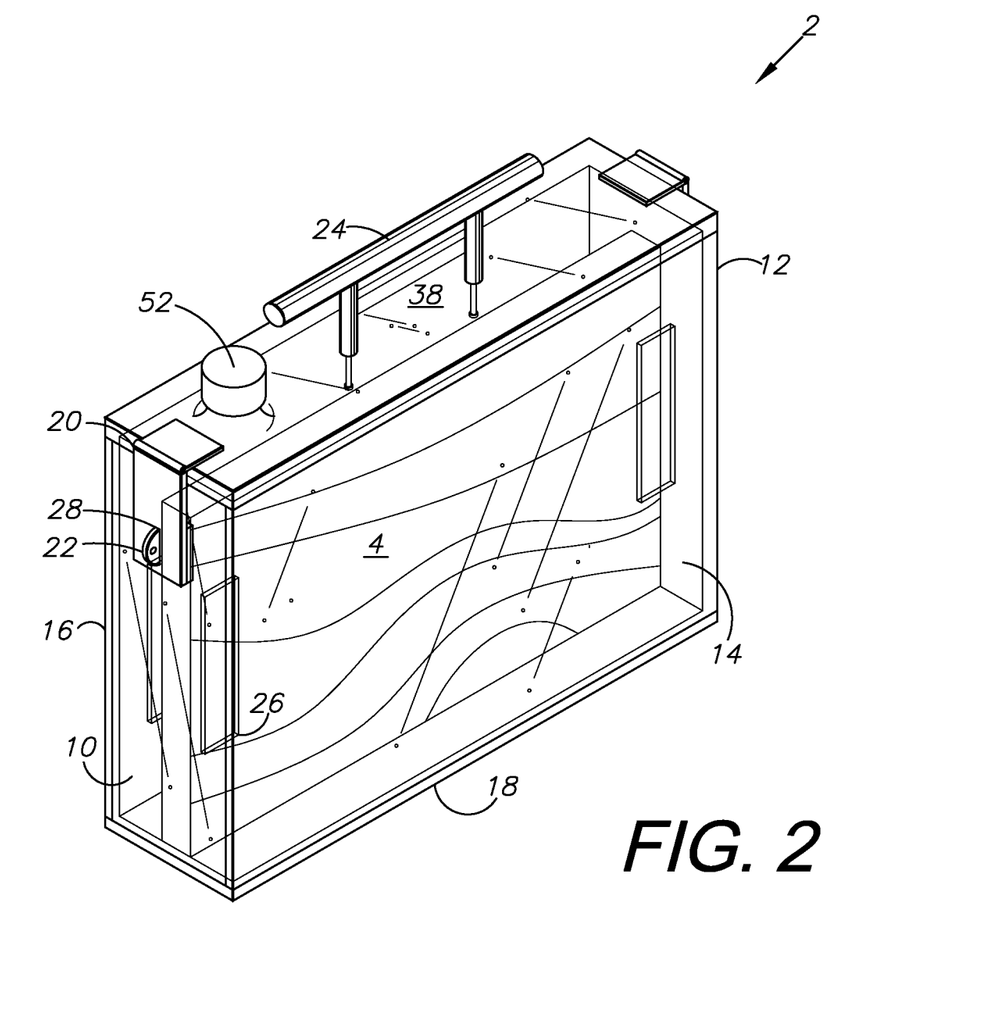
FIG. 2 is an isometric view of the present invention with the lid portion in place on the tank portion.

FIG. 2 shows the plank soaking system 2 when the lid portion 6 fully engages the tank portion 8. The lid portion contains at least two hinged latches 20. Each hinged latch contains a latch tab hole 28 for accepting a latch tab 22. Said latch tabs 22 are connected to the left 10 and right 12 walls of the tank portion 8, and positioned for accepting said hinged latch 20. When fully engaged, the lid lip 34 is flush with the face of the tank walls 10, 12, 14, 16, and the inset lid seal 32 fits tight against the inside of said walls and seals said enclosed space 30. While said latch tabs 22 are engaged with said hinged latches 20, said lid portion 6 cannot become unengaged from said tank portion 8. The plank 4 rests in the center of the tank portion 8 held in place by at least four plank securing tabs 26, at least two of said tabs on the inside of the left and right walls 10, 12. The gap between said securing tabs 26 is large enough to accept a variety of typical wood plank sizes for grilling, but leaves adequate interior space 30 to fill with a liquid 42 for complete soaking on all sides of the plank 4.

Figure 3:
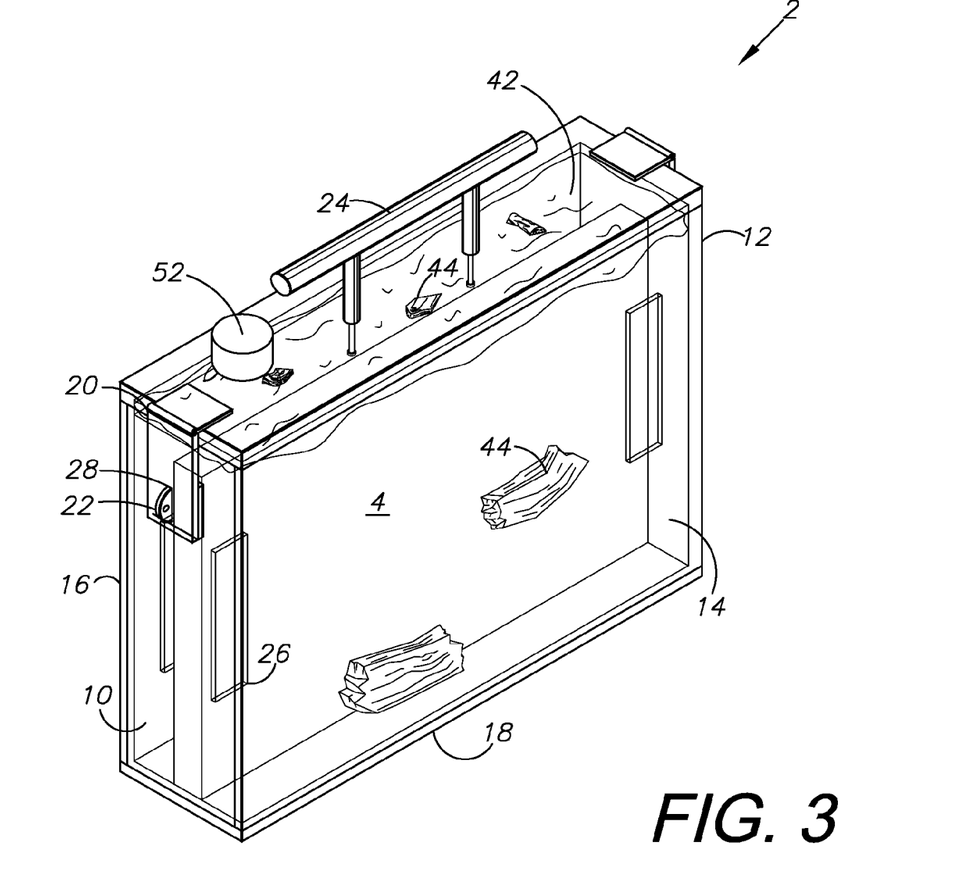
FIG. 3 is an isometric view of the present invention demonstrating a plank of wood submerged in liquid with other particles added to the liquid to impart flavor to the wood.
Figure 4:
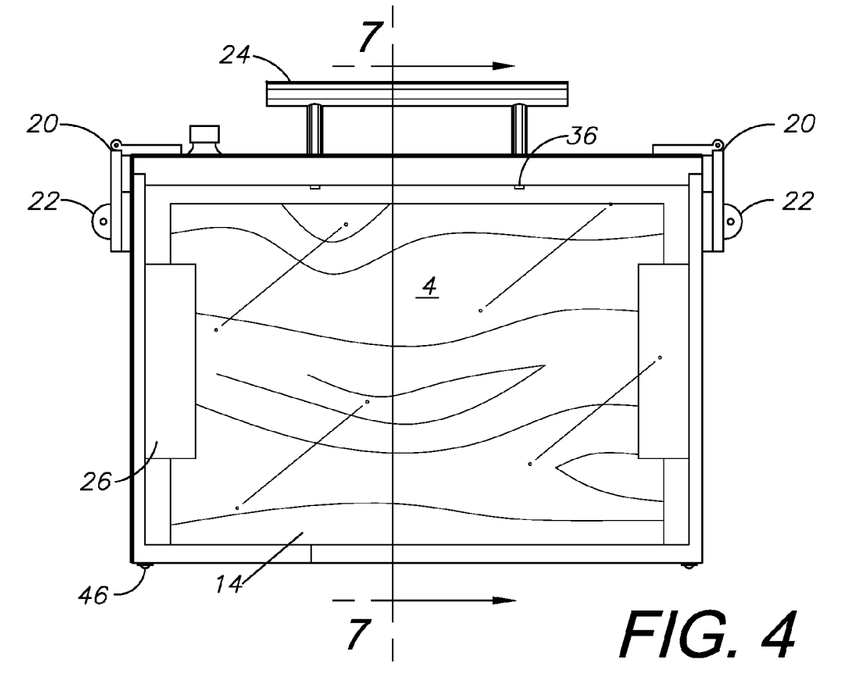
FIG. 4 is a front elevational view of the present invention.
Figure 5:
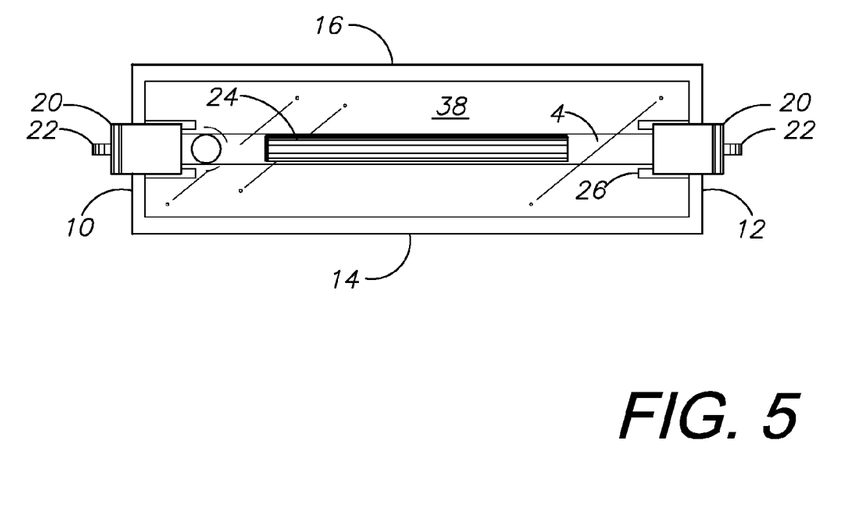
FIG. 5 is a top plan view of the present invention.
Figure 6:
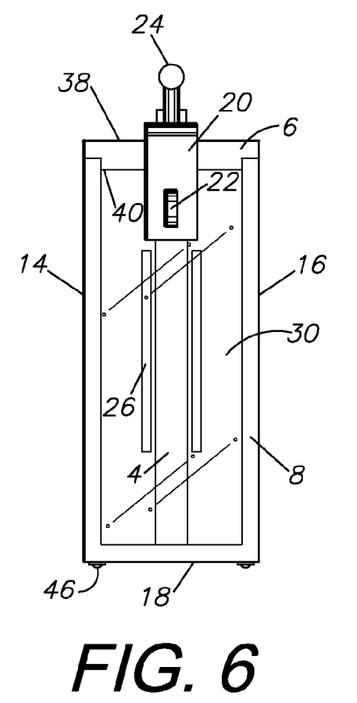
FIG. 6 is a side elevational view of the present invention.
Figure 7:
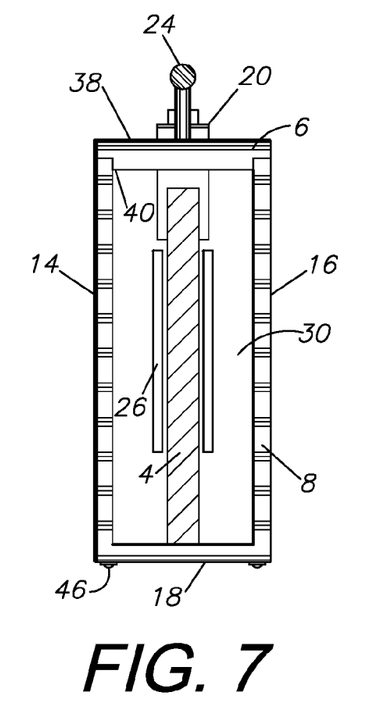
FIG. 7 is a cross-section of the present invention, taken along cut-line 7 in FIG. 4.
Figure 8:
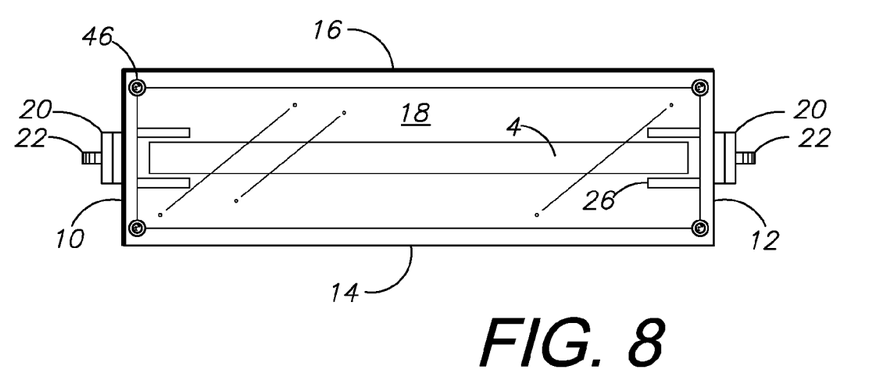
FIG. 8 is a bottom plan view of the present invention.

FIG. 3 shows a wood plank 4 submerged in a liquid 42 within the plank soaking system 2. Said liquid may be any liquid typically used in plank soaking, such as water, wine, juice, or cider. Fragments of other wood 44 or other types of flavoring devices can be added to said liquid 42 to provide additional flavor to the soaking wood plank 4. Flavors from the floating debris 44 will be absorbed by the liquid 42, which in turn seeps into the plank 4 while it is soaking. These flavors will soak into the wood evenly due to the design of the plank soaking system 2. FIGS. 4 through 8 contain additional views detailing the plank soaking system 2, including elevation and plan views. These views show that the tank floor 18 contain at least four tank feet 46 positioned on its outside face on the corners of the floor. These feet are merely to balance the system and cushion the device when it is being placed on a hard surface, such as a concrete patio.

The prior art in the field requires a wooden plank be submerged in liquid for some time period between twenty minutes and six hours. Typically, this is performed by placing a wooden plank in a container, such as a tub, sink, or bucket. Once in the container of liquid, a weighted object, such as a can, is placed on top of the plank to hold it submerged under the liquid. This process can result in uneven soaking of the wooden plank. For instance, the space underneath of the weighted object on the plank may not receive adequate soaking as it is cutoff from the liquid by the weighted object. Alternatively, the plank may shift in the liquid and float to the top, shifting the weighted object and leaving a portion of the plank out of the liquid and in the air. This would result in a lack of soaking over a portion of the plank. Improper soaking can not only lead to less flavor-filled wood planks, but may increase fire hazards as a dry plank is more susceptible to catching on fire while being cooked upon.

The present invention prevents such uneven soaking by completely submerging a plank 4 in a tank 8 and holding it underneath of the liquid 42 with the lid portion 6. The plank cannot thereafter float out of the liquid as the lid prevents this from happening. There is adequate space 30 in the tank 8 to allow liquid to completely surround the plank. Any flavors in the liquid will be absorbed by the wood 4 and all surfaces will be uniformly soaked and ready for grilling upon.

III. Alternative Embodiment Chip Soaking Sleeve 102

Figure 9:
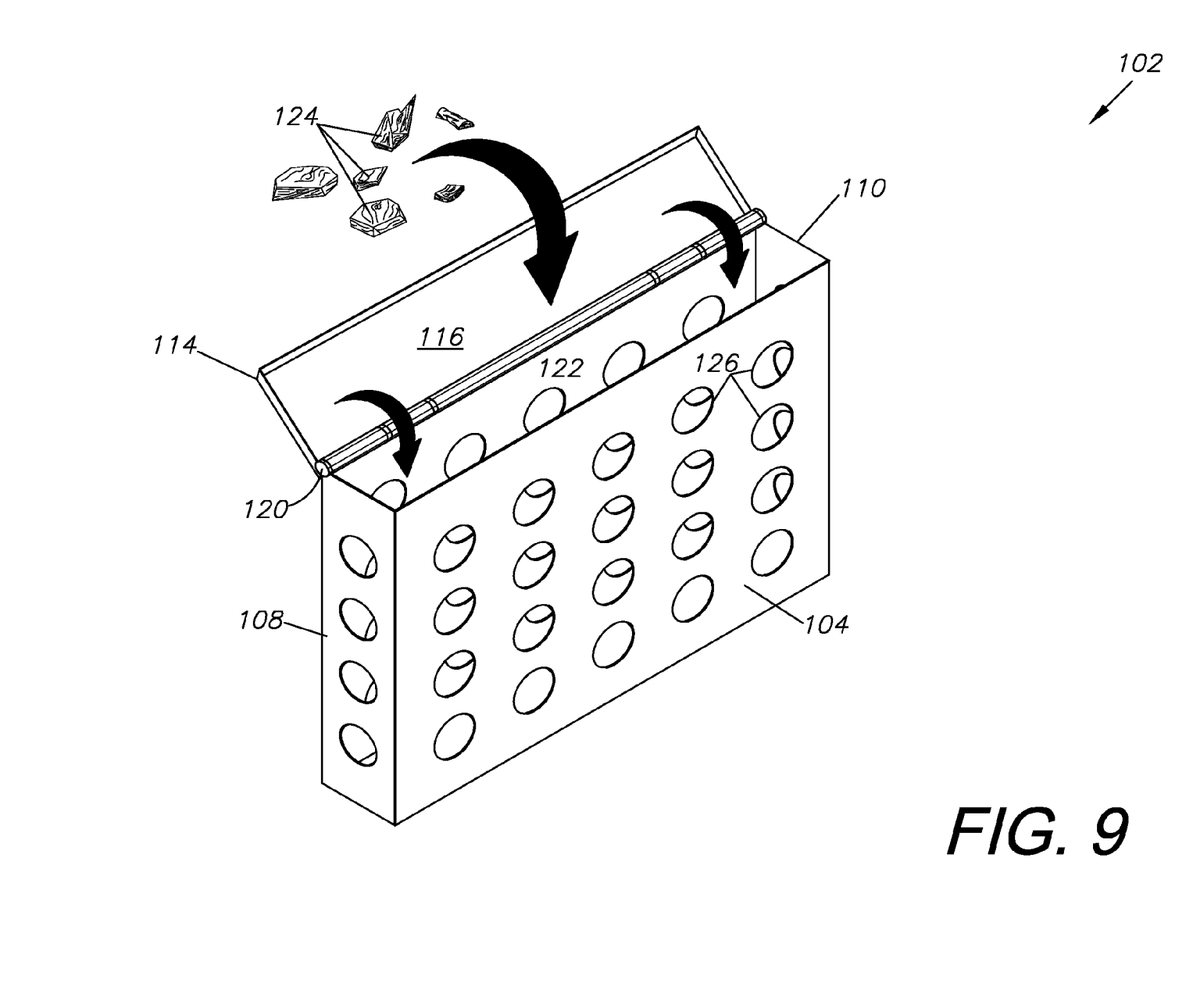
FIG. 9 is an isometric view of an alternative embodiment of the invention.
Figures 10A, 10B:
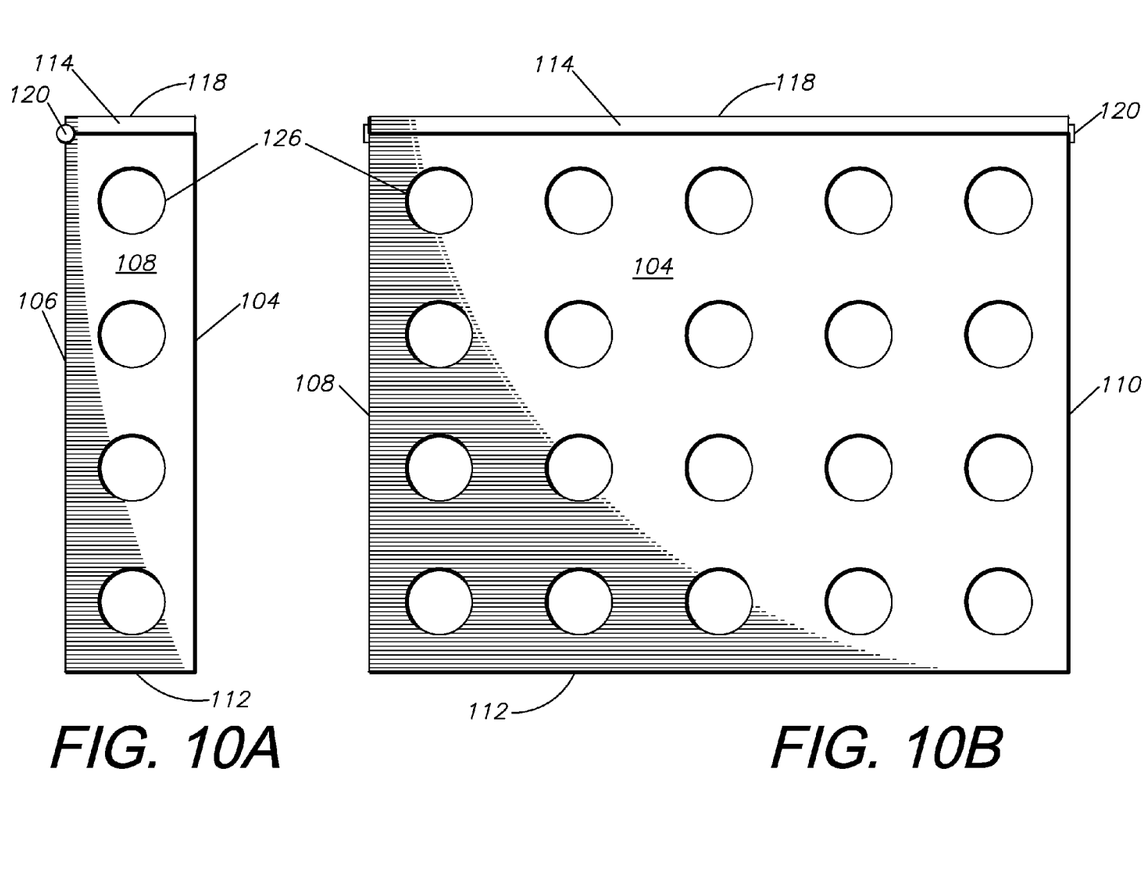
FIG. 10A is a side elevational view of an alternative embodiment of the invention.
FIG. 10B is a front elevational view of an alternative embodiment of the invention.
Figure 10C:
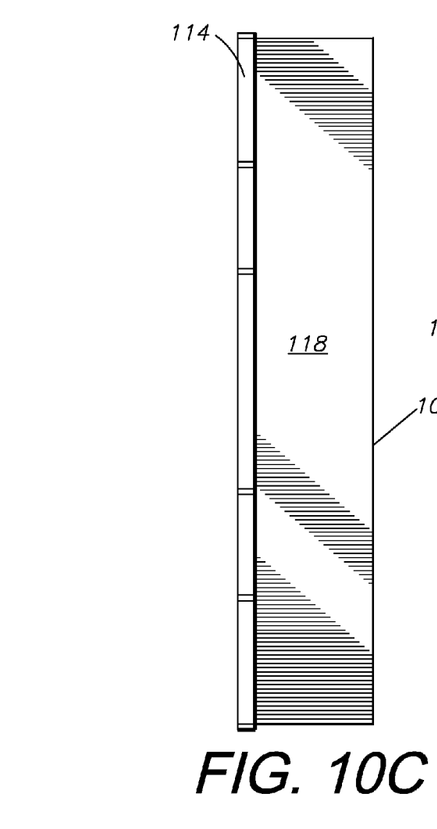
FIG. 10C is a plan view of the top of an alternative embodiment of the invention.
Figure 10D:
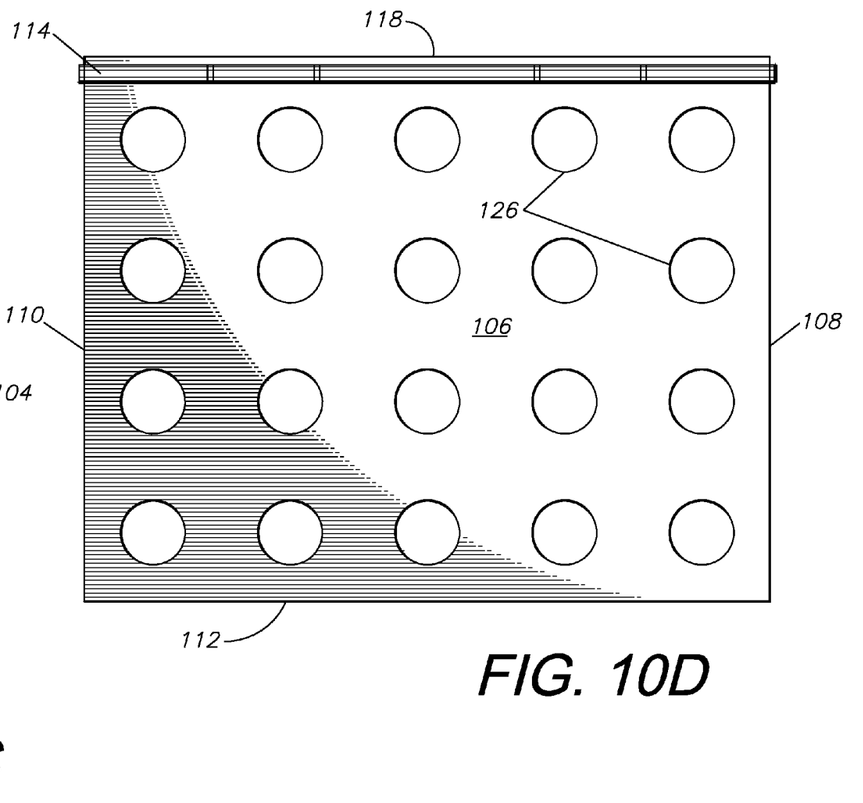
FIG. 10D is a rear elevational view of an alternative embodiment of the invention.
Figure 11:
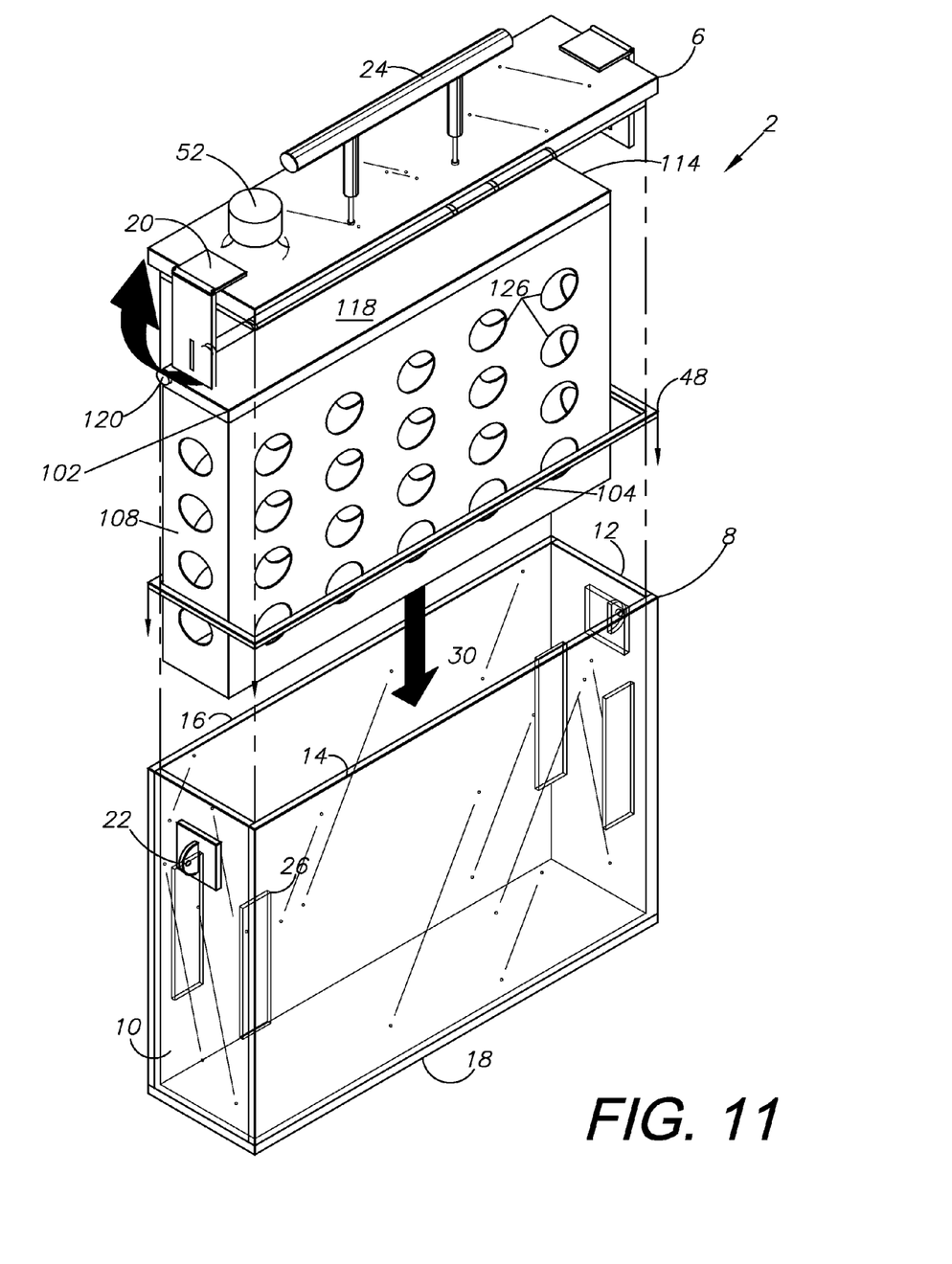
FIG. 11 is an isometric view of an alternative embodiment of the invention.

FIG. 9 displays an alternative embodiment of the plank soaking system 2, a chip soaking sleeve 102. FIGS. 10A, 10B, 10C, and 10D show alternative views of said sleeve 102. Said sleeve is filled with woodchips 124 and then placed into the plank soaking system 2 interior space 30 where a plank 4 would otherwise be placed. This method allows for the chips 124 loaded into the sleeve 102 will become thoroughly soaked without worrying about the chips floating to the surface of the water where one side will remain dry. Because wood chips cannot be loaded down inside of a bucket or other container of water in the same manner that a plank could be, this is a much more thorough method of creating soaked wood chips for use in cooking and preparing food.

Said chip soaking sleeve 102 is comprised of a front face 104, a back face 106, a left side 108, a right side 110, a bottom 112 and a lid 114. Said lid is further comprised of an interior face 116 and an exterior face 118. The lid 114 is connected to the body of the sleeve 102 by means of a lid hinge 120. Said hinge attaches the lid portion 114 to the back face 106 of the soaking sleeve 102 and allows the lid to open so that wood chips 124 can be loaded into the interior 122 of the chip soaking sleeve. A plurality of soaking holes 126 are punched into the front 104, back 106, left 108, and right 110 sides. These holes are large enough to allow liquid into the soaking sleeve, but small enough to prevent most woodchips 124 from sliding through the hole, where it will then float to the surface.

Said chip soaking sleeve 102 is comprised of some waterproof material, such as stainless steel, plastic, or other suitable materials. Likewise, the lid hinge 120 is made of a material such as stainless steel or aluminum to prevent rust from locking up said hinge. When the sleeve interior 122 is full of wood chips 124, the lid 114 can be closed and the sleeve 102 is placed into the plank soaking system 2. The system is then filled with a liquid 42 in the same manner as a plank would have been. The chips soak up the liquid and absorb any flavors the may have. After a period of time the sleeve 102 may be removed from the soaker 2 and the chips 124 can be dumped out and used to prepare food.

It is to be understood that while certain aspects of the disclosed subject matter have been shown and described, the disclosed subject matter is not limited thereto and encompasses various other embodiments and aspects.

Having thus described the invention, what is claimed as new and desired to be secured by Letters Patent is:

1. A system for soaking a wooden plank, which system comprises:
   a tank portion comprised of a front wall including an internal face and an external face, a back wall including an internal face and an external face, a proximate sidewall including an internal face and an external face, a distal sidewall including an internal face and an external face, a floor including an internal face and an external face, two latch tabs, and four securing tabs;

a lid portion conforming to the tank portion, the lid portion comprised of a top face, an inset bottom face, a proximate end, a distal end and a handle;

said front wall, back wall, proximate sidewall, distal sidewall, floor, and lid portion defining an enclosed box-shaped internal space having a height greater than either its width or its length;

said handle connected to the top face of said lid portion via handle screws;

a latch mounted on one of said tank portion and said lid portion, said latch having a closed position connecting said tank portion and said lid portion and an open position disconnecting said tank portion and said lid portion;

said tank portion adapted for selectively mounting said lid portion;

said latch comprises a hinged latch portion located on said lid portion and respective latch tabs located on said tank portion;

a pair of vertically oriented securing tabs located on the internal face of each of said proximate and distal side walls, said securing tabs adapted for securing a wooden plank in the center of said tank portion; and said tank portion adapted for receiving said wooden plank, wherein the height and length of said wooden plank fit within the height and width of the internal dimensions of said tank portion, and wherein said wooden plank is located between said securing tabs in a vertical orientation with respect to said tank portion.

2. The system of claim 1, wherein the lid portion includes a spout.

3. The system of claim 2 wherein said plank of wood is comprised of an aromatic wood for the preparation of food on a grill surface.

4. The system of claim 1 including wood chips in an internal space defined by the tank portion.

5. The system of claim 4 including water in the internal space defined by the tank portion.

6. The system of claim 5 wherein said wood chips comprise an aromatic wood for the preparation of food.

7. The system of claim 1 wherein said tank portion, said lid portion, said hinged latch portions, said latch tabs, and said securing tabs are comprised of clear plastic.

8. The system of claim 1 wherein said plank of wood is comprised of cedar.

9. The system of claim 1 including a water-proof gasket located between said tank portion and said lid portion.

10. A system for soaking a wooden plank, which system comprises:

a tank portion comprised of a front wall including an internal face and an external face, a back wall including an internal face and an external face, a proximate sidewall including an internal face and an external face, a distal sidewall including an internal face and an external face, a floor including an internal face and an external face, two latch tabs, and four securing tabs;

two of said securing tabs being fixedly connected to said proximate sidewall internal face in a vertical orientation, and two of said securing tabs being fixedly connected to said distal sidewall internal face in a vertical orientation;

one of said latch tabs being fixedly connected to said proximate sidewall external face, and one of said latch tabs being fixedly connected to said distal sidewall external face;

a lid portion conforming to the tank portion, the lid portion comprised of a top face, an inset bottom face, a proximate end, a distal end, a handle, two hinged latches including latch tab slots, a spout and a spout cap;

said front wall, back wall, proximate sidewall, distal sidewall, floor, and lid portion defining an enclosed box-shaped internal space having a height greater than either its width or its length;

said handle connected to the top face of said lid portion via handle screws;

one of said hinged latches being fixedly connected to said lid portion proximate end, and one of said hinged latches being fixedly connected to said lid portion distal end;

said spout in a threaded engagement with said spout cap;

a water-proof gasket;

said tank portion adapted for receiving said lid portion, wherein said latch tabs are received by the latch tab slots of said hinged latches, and wherein said water-proof gasket is located between said tank portion and said lid portion;

a sleeve defining an enclosed internal space, the sleeve conforming to the internal space defined by said tank portion, and said sleeve adapted for being received by said securing tabs;

said sleeve comprised of a front wall including an internal face and an external face, a back wall including an internal face and an external face, a proximate sidewall including an internal face and an external face, a distal sidewall including an internal face and an external face, a floor including an internal face and an external face, a top wall comprising a lid including an internal face and an external face, and a hinge connecting said top wall to said back wall;

wherein wood chips are introduced to the internal space defined by the sleeve portion; and said sleeve front wall, back wall, and sidewalls including a plurality of perforations, said perforations of suitable size to prevent said wood chips from escaping the internal space defined by said sleeve.

* * * * *